(12) United States Patent
Song et al.

(10) Patent No.: US 12,125,224 B2
(45) Date of Patent: Oct. 22, 2024

(54) DEPTH INFORMATION PROCESSING METHOD, APPARATUS, AND STORAGE MEDIUM

(71) Applicants: Beijing Baidu Netcom Science Technology Co., Ltd., Beijing (CN); BAIDU USA LLC, Sunnyvale, CA (US)

(72) Inventors: Xibin Song, Beijing (CN); Liangjun Zhang, Beijing (CN)

(73) Assignees: Beijing Baidu Netcom Science Technology Co., Ltd., Beijing (CN); BAIDU USA LLC, Sunnyvale, CA (US)

( * ) Notice: Subject to any disclaimer, the term of this patent is extended or adjusted under 35 U.S.C. 154(b) by 366 days.

(21) Appl. No.: 17/564,626

(22) Filed: Dec. 29, 2021

(65) Prior Publication Data
US 2022/0122281 A1    Apr. 21, 2022

(30) Foreign Application Priority Data

Jan. 7, 2021    (CN) .......................... 202110019698.1

(51) Int. Cl.
G06T 7/55    (2017.01)
G06V 20/56    (2022.01)
G06V 20/58    (2022.01)

(52) U.S. Cl.
CPC .............. G06T 7/55 (2017.01); G06V 20/58 (2022.01); G06V 20/588 (2022.01); G06T 2207/10028 (2013.01)

(58) Field of Classification Search
CPC . G06T 7/55; G06T 2207/10028; G06V 20/58; G06V 20/588
See application file for complete search history.

(56) References Cited

U.S. PATENT DOCUMENTS 6,151,961 A * 11/2000 Huber ..................... E21B 47/00
166/250.01
11,238,604 B1 * 2/2022 Baig ...................... G06N 20/00
(Continued)

FOREIGN PATENT DOCUMENTS

CN    109300151 A    2/2019
CN    109726659 A    5/2019
(Continued)

OTHER PUBLICATIONS

First Office Action for Chinese Application No. 2021100196981, mailed Jun. 8, 2023, 10 pages.
(Continued)

Primary Examiner — Kevin Ky
(74) Attorney, Agent, or Firm — KDW Firm PLLC

(57) ABSTRACT

Provided are a depth information processing method, an apparatus, and a storage medium, which relate to the field of image processing and, in particular, to computer vision, deep learning and autonomous driving. A specific implementation includes: determining intermediate depth information of a target scene according to sparse depth information of the target scene by a sub-model unit in a depth information supplementing model; and using intermediate depth information determined by a tail sub-model unit in the depth information supplementing model as dense depth information of the target scene.

13 Claims, 5 Drawing Sheets

---

S101

Determine intermediate depth information of a target scene according to sparse depth information of the target scene by a sub-model unit in a depth information supplementing model

S102

Use intermediate depth information determined by a tail sub-model unit in the depth information supplementing model as dense depth information of the target scene

(56) References Cited

U.S. PATENT DOCUMENTS

| | | | |
|---|---|---|---|
| 2010/0303340 A1* | 12/2010 | Abraham | G06T 7/285 |
| | | | 382/154 |
| 2011/0246128 A1* | 10/2011 | Nicholson | G01M 17/02 |
| | | | 702/145 |
| 2014/0177942 A1* | 6/2014 | Luo | G06T 7/593 |
| | | | 382/154 |
| 2019/0289281 A1 | 9/2019 | Badrinarayanan | |
| 2020/0193623 A1 | 6/2020 | Liu | |
| 2020/0226773 A1 | 7/2020 | Gan | |
| 2021/0194206 A1* | 6/2021 | Raring | H04B 10/40 |
| 2022/0122281 A1* | 4/2022 | Song | G06N 3/045 |
| 2022/0198693 A1* | 6/2022 | Li | G06T 7/579 |

FOREIGN PATENT DOCUMENTS

| | | | |
|---|---|---|---|
| CN | 110992271 A | | 4/2020 |
| CN | 111062981 A | | 4/2020 |
| CN | 112001914 A | | 11/2020 |
| WO | 2019178253 A1 | | 9/2019 |
| WO | 2020028072 A1 | | 2/2020 |

OTHER PUBLICATIONS

First Search Report for Chinese application No. 2021100196981, mailed Jun. 8, 2023, 5 pages.

Notice of Reasons for Refusal mailed Jan. 27, 2023 for Japanese Patent Application No. 2021-209696 (six (6) pages).

Supplemental Search Report for Chinese Application No. CN 2021100196981, dated Apr. 19, 2024, 6 pages.

* cited by examiner

DEPTH INFORMATION PROCESSING METHOD, APPARATUS, AND STORAGE MEDIUM

CROSS-REFERENCE TO RELATED APPLICATION

This application claims priority to Chinese Patent Application No. 202110019698.1 filed on Jan. 7, 2021, the disclosure of which is incorporated herein by reference in its entirety.

TECHNICAL FIELD

The present disclosure relates to the technical field of image processing and, in particular, to computer vision, deep learning and autonomous driving techniques.

BACKGROUND

Depth perception refers to the perception of the distances of different objects in the same scene. The depth perception is an important part for many computer vision tasks (such as an automatic navigation task).

For example, a radar device usually can generate only a sparse depth map lacking in much depth data. A depth completion technique refers to a method of recovering dense scene depth information with collected discrete scene depth information as input.

SUMMARY

The present disclosure provides depth information processing method, an apparatus, and a storage medium.

According to an aspect of the present disclosure, a depth information processing method is provided. The method includes the steps as described below.

Intermediate depth information of a target scene is determined according to sparse depth information of the target scene by a sub-model unit in a depth information supplementing model.

Intermediate depth information determined by a tail sub-model unit in the depth information supplementing model is used as dense depth information of the target scene.

According to another aspect of the present disclosure, an electronic apparatus is provided. The apparatus includes at least one processor and a memory communicatively connected to the at least one processor.

The memory stores an instruction executable by the at least one processor, where the instruction is executed by the at least one processor to enable the at least one processor to perform the following steps: determining intermediate depth information of a target scene according to sparse depth information of the target scene by a sub-model unit in a depth information supplementing model; and using intermediate depth information determined by a tail sub-model unit in the depth information supplementing model as dense depth information of the target scene.

According to another aspect of the present disclosure, a non-transitory computer-readable storage medium is provided. The storage medium stores a computer instruction for causing a computer to perform the following steps: determining intermediate depth information of a target scene according to sparse depth information of the target scene by a sub-model unit in a depth information supplementing model; and using intermediate depth information determined by a tail sub-model unit in the depth information supplementing model as dense depth information of the target scene.

According to the technical solutions of the present disclosure, the prediction accuracy of dense depth information is improved.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure. In the drawings.

DETAILED DESCRIPTION

Exemplary embodiments of the present disclosure are described hereinafter in conjunction with the drawings, where details of embodiments of the present disclosure are contained to facilitate understanding. It is understood these details are illustrative only. Therefore, it is understood by those of ordinary skill in the art that various changes and modifications may be made to the embodiments described herein without departing from the scope and spirit of the present disclosure. Similarly, description of well-known functions and constructions is omitted hereinafter for clarity and conciseness.

Figure 1:
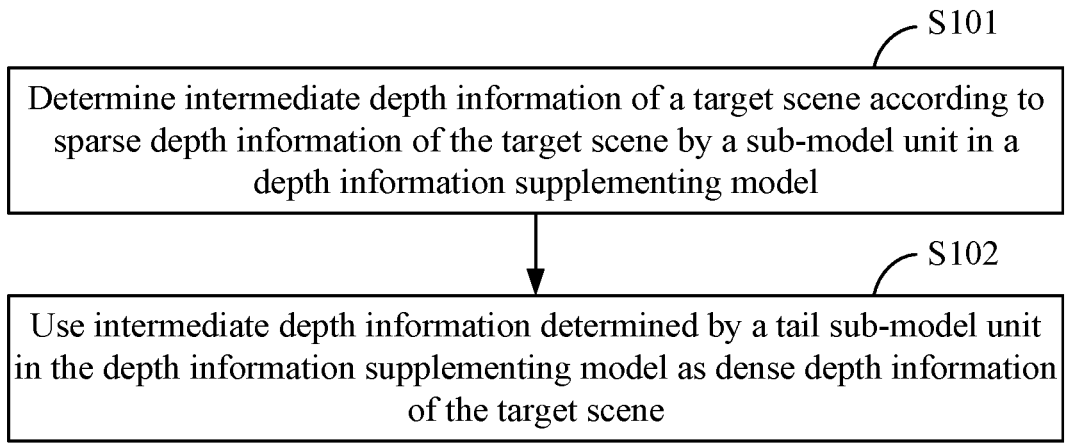
FIG. 1 is a schematic diagram of a depth information processing method according to an embodiment of the present disclosure.

FIG. 1 is a flowchart of a depth information processing method according to an embodiment of the present disclosure. The embodiment is applicable to the case where sparse depth information of a target scene is supplemented to generate dense depth information of the target scene. The method in the embodiment may be performed by a depth information processing device. The device may be implemented by software and/or hardware and specifically configured in an electronic apparatus having a certain data computing capability.

In S101, intermediate depth information of the target scene is determined according to the sparse depth information of the target scene by a sub-model unit in a depth information supplementing model.

The depth information supplementing model is used for supplementing the sparse depth information to generate the dense depth information, where depth information supplementation may be understood as depth information prediction. Depth information of a scene may be described using an image in which pixels have depth information. A difference between the sparse depth information and the dense depth information may refer to different proportions of effective pixels in an image. A proportion (such as 20%) of pixels having depth information in an image corresponding to the sparse depth information to all pixels included in the image is lower than a proportion (such as 80%) of pixels having depth information in an image corresponding to the dense depth information to all pixels included in the image. Moreover, in the image corresponding to the sparse depth information, the pixels having depth information are distributed unevenly and sparsely; and in the image corresponding to the dense depth information, the pixels having depth information are distributed evenly and densely. The dense depth information is richer and denser than the sparse depth information.

The depth information supplementing model may refer to a pre-trained deep learning model. The depth information supplementing model includes multiple sub-model units that may be connected in series and/or in parallel.

The target scene may include any application scene. Exemplarily, the target scene may be a scene of a real road. In another example, the target scene may be a scene where a stereoscopic object is located. The sparse depth information of the target scene may refer to a depth information image of the target scene collected by a radar or a depth sensor, where pixels in the depth information image have depth information. A device for collecting the sparse depth information may be configured on a robot, an unmanned vehicle and a terminal device. The robot, the unmanned vehicle or the terminal device may be used for collecting the depth information of the target scene in real time when it is moving or stationary. Additionally, the collected depth information image is usually a monocular image.

The sparse depth information of the target scene serves as input data of the depth information supplementing model. Optionally, the sparse depth information of the target scene serves as input data of a head sub-model unit or each sub-model unit in the depth information supplementing model. The sparse depth information is inputted into the depth information supplementing model, and each sub-model unit individually determines its corresponding intermediate depth information. The intermediate depth information may refer to a prediction result of depth information outputted by the sub-model unit and is usually depth information formed by supplementing inputted depth information of the sub-model unit. Each sub-model unit outputs one piece of intermediate depth information corresponding to the each sub-model unit.

In S102, intermediate depth information determined by a tail sub-model unit in the depth information supplementing model is used as the dense depth information of the target scene.

The tail sub-model unit may refer to a sub-model unit at an end of multiple connected sub-model units. Exemplarily, among multiple sub-model units which are connected in series only, a sub-model unit at the end is the tail sub-model unit; or multiple sub-model units which are connected in parallel and located at the end are all tail sub-model units. In the case where the number of the tail sub-model unit is one, the intermediate depth information outputted by the tail sub-model unit is determined to be the dense depth information of the target scene, that is, determined to be dense depth information of the depth information supplementing model. The dense depth information of the target scene serves as output data of the depth information supplementing model. The depth information supplementing model is used for supplementing the sparse depth information into the dense depth information.

According to the technical solution of the present disclosure, pieces of intermediate depth information of the target scene are respectively determined according to the sparse depth information of the target scene by the sub-model units in the depth information supplementing model so that the sparse depth information is gradually supplemented, and the intermediate depth information from the tail sub-model unit is determined to be the dense depth information of the target scene; hence, the sparse depth information is supplemented in multiple stages, depth information is fully supplemented, and the accuracy of depth information prediction is improved.

Figure 2:
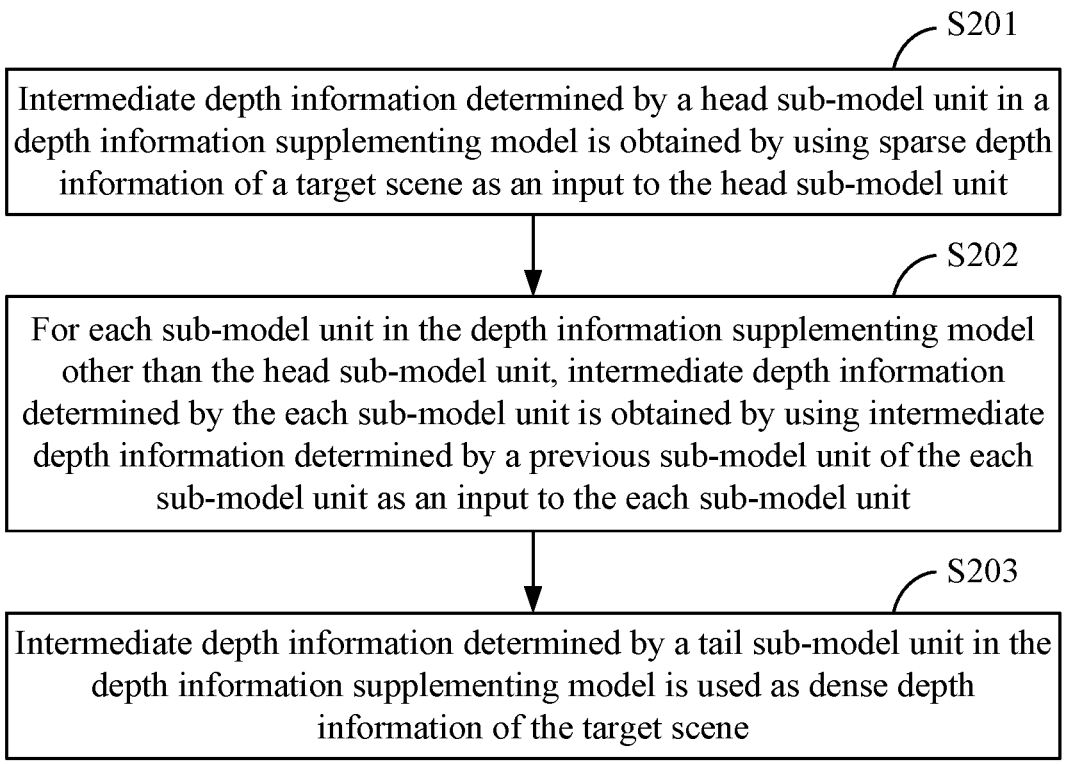
FIG. 2 is a schematic diagram of a depth information processing method according to an embodiment of the present disclosure.

FIG. 2 is a flowchart of another depth information processing method according to an embodiment of the present disclosure. The method is further optimized and extended based on the preceding technical solution and may be combined with the preceding various optional embodiments.

In S201, intermediate depth information determined by a head sub-model unit in a depth information supplementing model is obtained by using sparse depth information of a target scene as an input to the head sub-model unit.

The depth information supplementing model includes sub-model units connected in series. The sparse depth information of the target scene serves as the input to the head sub-model unit in the depth information supplementing model and processed by the head sub-model unit so that the intermediate depth information determined by the head sub-model unit is obtained and transmitted to a next sub-model unit.

The head sub-model unit is configured to supplement the sparse depth information to obtain the intermediate depth information determined by the head sub-model unit. A proportion of pixels having depth information in an image corresponding to the intermediate depth information determined by the head sub-model unit is higher than a proportion of pixels having depth information in an image corresponding to the sparse depth information, which may be understood in the following manner: the intermediate depth information determined by the head sub-model unit is denser than the sparse depth information and the intermediate depth information determined by the head sub-model unit is richer than the sparse depth information.

In S202, for each sub-model unit in the depth information supplementing model other than the head sub-model unit, intermediate depth information determined by the each sub-model unit is obtained by using intermediate depth information determined by a previous sub-model unit of the each sub-model unit as an input to the each sub-model unit.

The sub-model unit other than the head sub-model unit may refer to a non-head sub-model unit. The previous sub-model unit of the sub-model unit other than the head sub-model unit is connected in series to the sub-model unit other than the head sub-model unit, and output of the previous sub-model unit of the sub-model unit other than the head sub-model unit serves as input of the sub-model unit other than the head sub-model unit. The output of the previous sub-model unit of the sub-model unit other than the head sub-model unit includes the intermediate depth information. The sub-model unit other than the head sub-model unit processes the intermediate depth information determined by the previous sub-model unit to obtain the intermediate depth information determined by the sub-model unit other than the head sub-model unit Images corresponding to respective pieces of intermediate depth information have the same image dimension and have the same image dimension as the image corresponding to the sparse depth information of the target scene, where the image dimension may include the number of channels, an image width, an image height and the like.

In fact, the head sub-model unit learns a difference between the sparse depth information and true dense depth information, and each sub-model unit other than the head sub-model unit may learn a difference between the intermediate depth information outputted by a previous sub-model unit and the true dense depth information. Through continuous learning, pieces of intermediate depth information outputted by respective sub-model units gradually get closer to the true dense depth information. The true dense depth information is true depth information of the target scene, that is, each pixel in a corresponding image has depth information.

Figure 3:
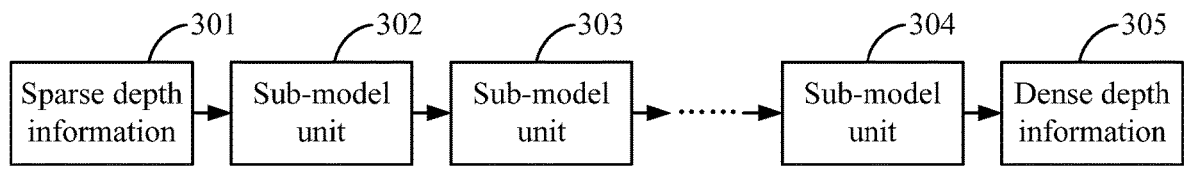
FIG. 3 is a schematic diagram of a depth information supplementing model that may implement an embodiment of the present disclosure.

As shown in FIG. 3, the depth information supplementing model includes multiple sub-model units 302 to 304 connected in series. The sub-model unit 302 is the head sub-model unit and the sub-model unit 304 is a tail sub-model unit. The sub-model unit 302 receives and processes sparse depth information 301 to obtain intermediate depth information, and transmits the intermediate depth information to the next sub-model unit 303 connected in series. It is the same for other sub-model units until the sub-model unit 304 outputs intermediate depth information, and such intermediate depth information is determined to be dense depth information 305. Optionally, the depth information supplementing model includes at least two sub-model units.

An existing deep learning model for depth information supplementation usually processes depth information only in a single stage to directly obtain supplemented depth information. However, depth information is difficult to be supplemented by one step so that the depth information cannot be supplemented fully. According to the technical solution of the present disclosure, among the multiple sub-model units connected in series, each sub-model unit supplements the intermediate depth information provided by the previous sub-model unit so that the depth information is supplemented in multiple stages, the sparse depth information is gradually and accumulatedly supplemented and gets denser gradually, and the density of depth information can be accurately improved.

In S203, the intermediate depth information determined by the tail sub-model unit in the depth information supplementing model is used as the dense depth information of the target scene.

According to the technical solution of the present disclosure, among the multiple sub-model units connected in series, each sub-model unit supplements the intermediate depth information provided by the previous sub-model unit so that the sparse depth information is gradually and accumulatedly supplemented and gets denser gradually through multiple stages of depth information supplementation, which can accurately improve the density of depth information and thus improve the accuracy of depth information prediction.

Figure 4:
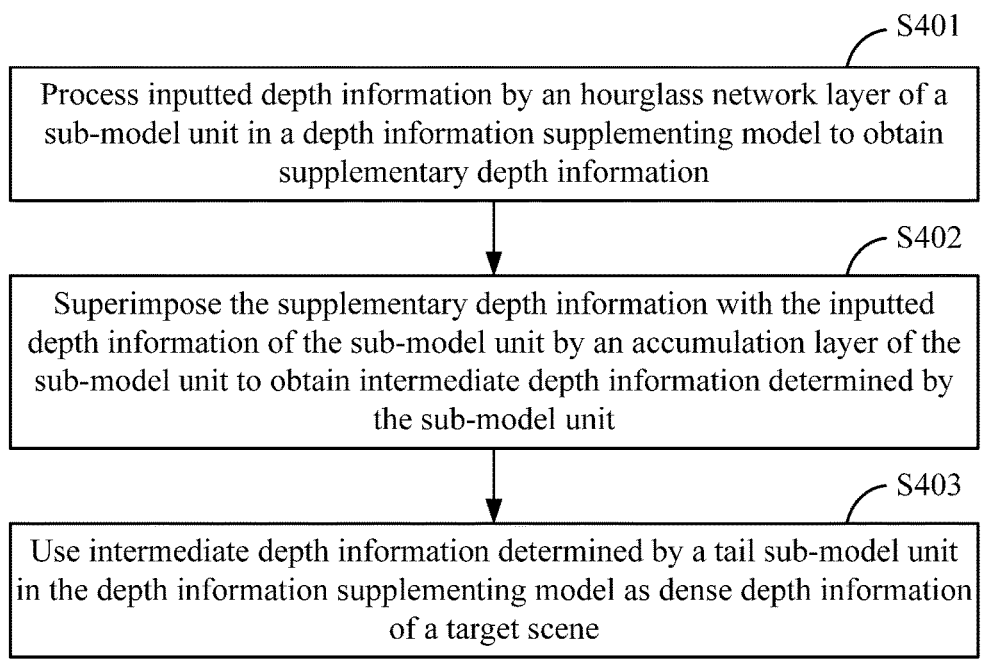
FIG. 4 is a schematic diagram of a depth information processing method according to an embodiment of the present disclosure.

FIG. 4 is a flowchart of another depth information processing method according to an embodiment of the present disclosure. The method is further optimized and extended based on the preceding technical solutions and may be combined with the preceding various optional embodiments.

In S401, inputted depth information is processed by an hourglass network layer of a sub-model unit in a depth information supplementing model to obtain supplementary depth information.

All sub-model units have the same structure and each include the hourglass network layer and an accumulation layer. The hourglass network layer is connected to the accumulation layer, and input of the accumulation layer includes output of the hourglass network layer. The supplementary depth information may refer to depth information in which the inputted depth information is lacking. The supplementary depth information is added to the inputted depth information to supplement the inputted depth information so that intermediate depth information is generated. An image corresponding to the supplementary depth information has the same dimension as an image corresponding to the inputted depth information.

The hourglass network layer (hourglass networks) includes an encoder and a decoder. The encoder and the decoder are symmetrical and the encoder includes the same number of convolution layers as the decoder, so that the image corresponding to the supplementary depth information outputted by the hourglass network layer has the same dimension as the image corresponding to the inputted depth information. The encoder is used for feature extraction and the decoder may be regarded as a reverse operation of the encoder. Exemplarily, the encoder may employ a deep convolutional neural network such as a Visual Geometry Group (VGG) or a residual network (ResNet). Each convolution operation includes a convolution core of k*k and a c-layer channel.

Figure 5:
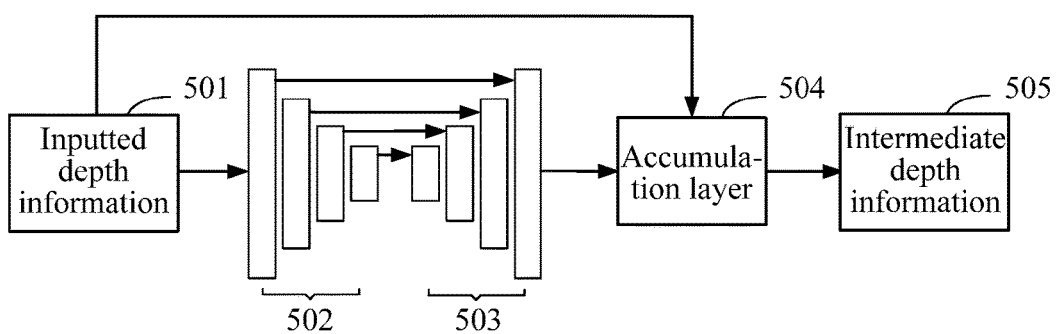
FIG. 5 is a schematic diagram of a sub-model unit that may implement an embodiment of the present disclosure.

As shown in FIG. 5, in the structure of the sub-model unit, the sub-model unit acquires inputted depth information 501, processes the inputted depth information 501 by an encoder 502 and a decoder 503 in the hourglass network layer to obtain supplementary depth information, and inputs the supplementary depth information into an accumulation layer 504. The accumulation layer 504 further acquires the inputted depth information 501 and accumulates the supplementary depth information and the inputted depth information 501 to obtain intermediate depth information 505. The inputted depth information 501 may be sparse depth information or intermediate depth information. In the hourglass network layer, two convolution layers connected by an arrow in the encoder 502 and the decoder 503 correspond to each other and have the same dimension, and a convolution layer in the decoder 503 needs to perform feature fusion on output of the corresponding convolution layer (that is, a convolution layer connected by the arrow). Exemplarily, both the decoder 503 and the encoder 502 include four convolution layers. In a sequence from left to right, input of a first convolution layer of the decoder 503 is a feature obtained by a last convolution layer (that is, a fourth convolution layer) of the encoder 502 through convolution, where the feature has a minimum size. Input of a subsequent convolution layer of the decoder 503 is output of a previous convolution layer of the decoder 503 and output of the corresponding layer of the encoder 502, that is, up-sampling is performed and then an output feature obtained in a convolution layer of the encoder 502 with the same size is fused. A fusion manner may be pixel accumulation or may be concatenation and convolution.

In S402, the supplementary depth information is superimposed with the inputted depth information of the sub-model unit by the accumulation layer of the sub-model unit so that the intermediate depth information determined by the sub-model unit is obtained.

The accumulation layer is used for pixel-level accumulation on the inputted depth information and the supplementary depth information and specifically used for depth information accumulation pixel by pixel for images of the same dimension.

Optionally, the step in which the supplementary depth information is superimposed with the inputted depth information of the sub-model unit includes: determining a matching relationship between supplementary pixels in the supplementary depth information and sparse pixels in the inputted depth information by the accumulation layer of the sub-model unit; and superimposing supplementary depth data of the supplementary pixels with sparse depth data of matched sparse pixels.

The matching relationship is used for determining a relationship between supplementary pixels and sparse pixels and determining supplementary pixels and sparse pixels to be superimposed. Optionally, the matching relationship may refer to that the supplementary pixel and the sparse pixel at the same position in images match each other. In fact, the image of the supplementary depth information has the same dimension as the image of the inputted depth information, and the matching relationship may be established between the supplementary pixel and the sparse pixel at the same position. The supplementary depth data is used for describing a depth information value of the supplementary pixel and the sparse depth data is used for describing a depth information value of the sparse pixel. The supplementary depth data and the sparse depth data that match each other may be directly accumulated, the obtained depth data may be determined to be depth data corresponding to a new pixel at a matching position, and new pixels having new depth data are combined into a new image that is determined to be the intermediate depth information.

The supplementary pixel and the matched sparse pixel are determined and depth data of the two pixels are superimposed so that pixel-level superimposition of depth data is realized, and depth information can be accurately predicted pixel by pixel. Therefore, new pixels formed after superimposition and corresponding new depth data are obtained so that the intermediate depth information is determined, thereby accurately predicting depth information of each pixel in the intermediate depth information and improving the accuracy of depth information prediction.

In S403, intermediate depth information determined by a tail sub-model unit in the depth information supplementing model is used as dense depth information of a target scene.

Optionally, the depth information processing method further includes: determining depth feature information according to pixel information of the target scene by the sub-model unit in the depth information supplementing model; and adjusting the intermediate depth information determined by the sub-model unit according to the depth feature information.

The pixel information may refer to pixel values of pixels. The pixel information is used for describing color features of the target scene. The pixel information of the target scene may be collected by a color camera under the same collection condition as the sparse depth information, where the same collection condition may refer to that at least one of conditions such as an angle of view, brightness and a camera parameter is the same. Usually, a pixel value may be represented by RGB (red, green and blue). The depth feature information is used for describing depth features learned by the sub-model unit from the pixel information of the target scene. The depth feature information is used for adjusting the intermediate depth information determined by the sub-model unit and updating the intermediate depth information so that the intermediate depth information is more accurate and richer. In fact, in the target scene, pixels having the same depth information in one object correspond to the same pixel information. For example, pixels on the same plane and belonging to the same part with respect to a collection plane in one object have the same depth and color. Therefore, pixel information and depth information of some pixels in the one object are consistent so that the pixel information of the target scene can be inputted into the sub-model unit for the sub-model unit to learn the pixel information. Moreover, the pixel information is rich and dense and can instruct identification of a scene. For example, the pixel information instructs a contour of each object in the scene. Usually, depth information belonging to the same object is more likely to be the same so that depth information of pixels belonging to the same object can be predicted based on this. In this way, the intermediate depth information is adjusted according to the depth feature information determined according to the pixel information, which enables the sub-model unit to better predict depth information and improves the accuracy of depth information prediction.

Figure 6:
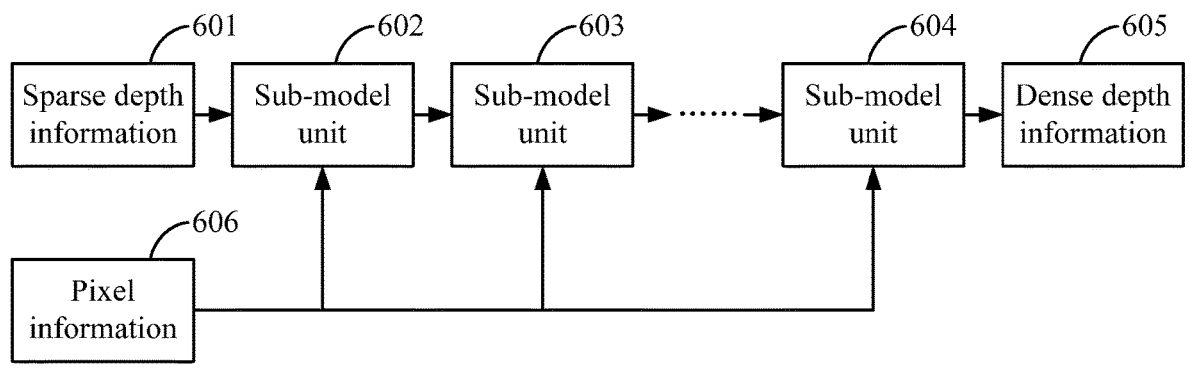
FIG. 6 is a schematic diagram of a depth information supplementing model that may implement an embodiment of the present disclosure.

In a specific example, as shown in FIG. 6, pixel information 606 and inputted depth information are collectively inputted into each sub-model unit (602 to 604). Sparse depth information 601 of the target scene and the pixel information 606 of the target scene serve as input of a head sub-model unit 602 in the depth information supplementing model so that intermediate depth information determined by the head sub-model unit is obtained. The intermediate depth information is depth information obtained in a manner that intermediate depth information determined according to the sparse depth information 601 is adjusted using depth feature information determined according to the pixel information 606. For each sub-model unit other than the head sub-model unit in the depth information supplementing model, intermediate depth information determined by a previous sub-model unit of the each sub-model unit (603 and 604) and the pixel information of the target scene serve as input of the each sub-model unit so that intermediate depth information determined by the each sub-model unit is obtained. The intermediate depth information determined by the each sub-model unit is depth information obtained in a manner that intermediate depth information determined according to the intermediate depth information determined by the previous sub-model unit is adjusted using depth feature information determined according to the pixel information.

Figure 7:
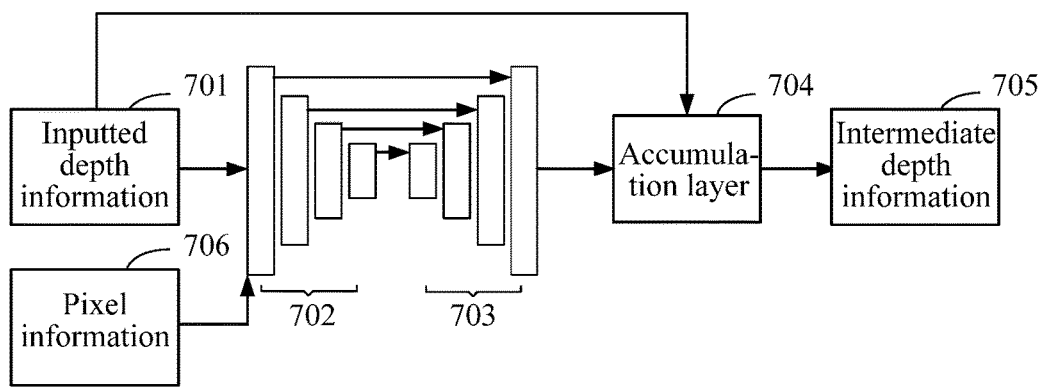
FIG. 7 is a schematic diagram of a sub-model unit that may implement an embodiment of the present disclosure.

As shown in FIG. 7, inputted depth information 701 and pixel information 706 are processed by the hourglass network layer of the sub-model unit in the depth information supplementing model so that supplementary depth information is obtained. The hourglass network layer includes an encoder 702 and a decoder 703. The supplementary depth information is actually depth information obtained in a manner that the hourglass network layer adjusts, according to depth feature information determined according to the pixel information 706, supplementary depth information determined by the hourglass network layer according to the inputted depth information 701. The supplementary depth information is superimposed with the inputted depth information of the sub-model unit by the accumulation layer 704 of the sub-model unit so that intermediate depth information 705 determined by the sub-model unit is obtained. The intermediate depth information 705 is depth information obtained in a manner that intermediate depth information determined according to the inputted depth information is adjusted using the pixel information.

Depth prediction is assisted by color information in each sub-model unit so that a prediction result of dense depth is more accurate.

The hourglass network layer extracts multi-scale depth information features, and the intermediate depth information outputted by the previous sub-model unit of each sub-model unit other than the head sub-model unit is determined to be the input of the each sub-model unit other than the head sub-model unit so that a learning object of each sub-model unit is a residual between the intermediate depth information from the previous sub-model unit and true dense depth information. Therefore, pieces of inputted intermediate depth information gradually get close to the true dense depth information through iterations, thereby obtaining a high-quality recovery result of the dense depth information.

Figure 8:
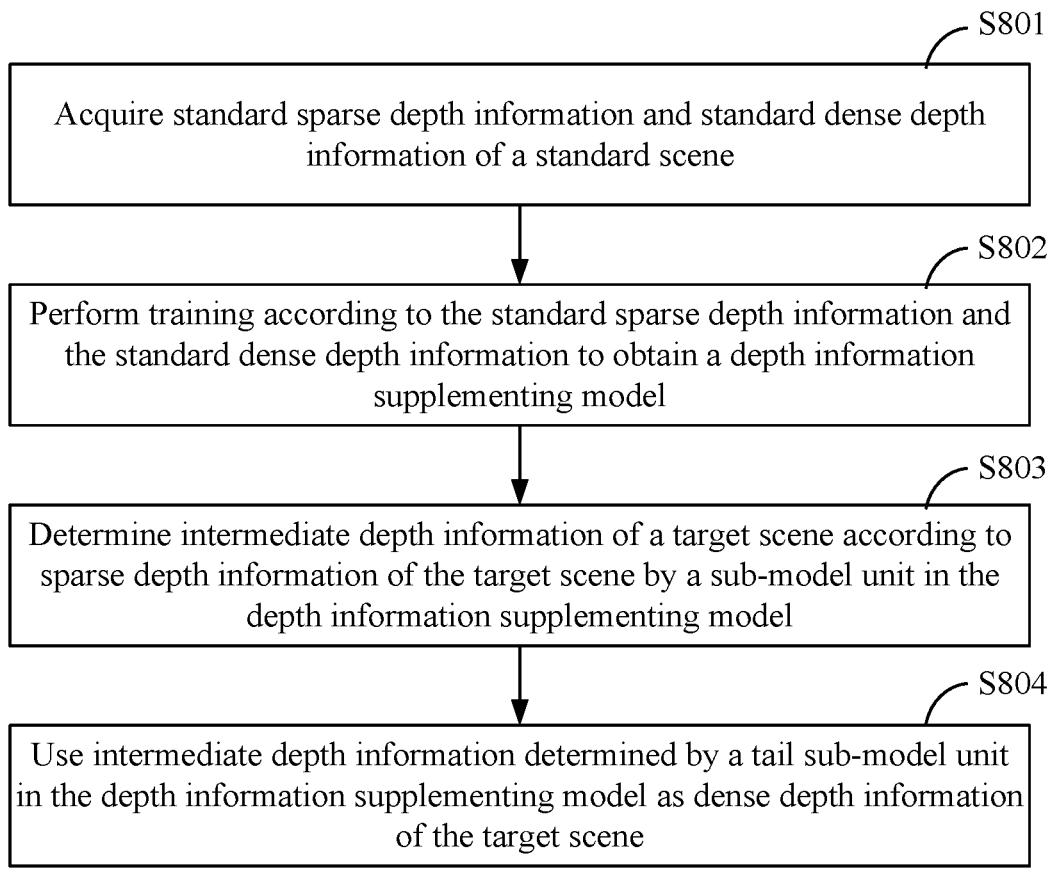
FIG. 8 is a schematic diagram of a depth information processing method according to an embodiment of the present disclosure.

FIG. 8 is a flowchart of another depth information processing method according to an embodiment of the present disclosure. The method is further optimized and extended based on the preceding technical solutions and may be combined with the preceding various optional embodiments.

In S801, standard sparse depth information and standard dense depth information of a standard scene are acquired.

The standard sparse depth information serves as input data of a model and the standard dense depth information serves as a true value of the model. The standard sparse depth information and the standard dense depth information are depth information collected and processed for the same standard scene. The standard sparse depth information and the standard dense depth information of the standard scene are used as one training sample for training a deep learning model so that a depth information supplementing model is obtained. Respective collections may be performed on at least one standard scene so that multiple sample pairs are formed. Different sample pairs may correspond to different standard scenes or the same standard scene. A large number of sample pairs are acquired so that a training data set is formed for training the deep learning model, so as to obtain the depth information supplementing model.

Optionally, the step in which the standard sparse depth information and the standard dense depth information of the standard scene are acquired includes: performing image collection on the standard scene using a depth sensor to obtain the standard dense depth information; and sampling the standard dense depth information to generate the standard sparse depth information.

The depth sensor may refer to a high-precision depth sensor and can collect high-precision depth information. Depth information obtained in a manner that the image collection is performed on the standard scene using the depth sensor may be considered as relatively dense depth information and thus can be used as the standard dense depth information. The standard dense depth information is sampled so that the standard dense depth information is screened and a small number of pixels having depth information are obtained. Thus, the standard sparse depth information is formed. That is, the standard dense depth information is converted from the relatively dense depth information to relatively sparse and discrete depth information.

The image collection is performed on the standard scene using the depth sensor, the obtained depth information is used as the standard dense depth information, and sparse sampling is performed on the standard dense depth information so that the standard sparse depth information is formed and the training sample can be quickly generated.

Optionally, the step in which the standard sparse depth information and the standard dense depth information of the standard scene are acquired includes: performing video collection on the standard scene using a radar device to obtain multiple consecutive frames of sparse depth information; projecting the multiple consecutive frames of sparse depth information to generate the standard dense depth information; and acquiring sparse depth information matching the standard dense depth information from the multiple consecutive frames of sparse depth information and determining the acquired sparse depth information as the standard sparse depth information.

The radar device may refer to a low-precision depth collection device and can collect low-precision depth information. Performing the video collection on the standard scene using the radar device may refer to performing continuous collection on the standard scene to generate video stream data. The video stream data includes multiple frames of sparse depth information.

Different frames of sparse depth information may be collected at different angles of view and thus can be used as different sparse depth information captured by a multi-view radar device. Accordingly, projecting the multiple consecutive frames of sparse depth information is actually fusing multi-view sparse depth information into monocular dense depth information and determining the monocular dense depth information to be the standard dense depth information. Specifically, the multiple consecutive frames of sparse depth information are projected onto any one frame so that one frame of corresponding dense depth information is obtained, and the selected one frame of sparse depth information is determined to be the standard sparse depth information. The sparse depth information matching the standard dense depth information may refer to sparse depth information having the same collection condition as the standard dense depth information.

A fusion manner may be determining pixels included in a certain frame under a certain angle of view and depth information of the pixels included in the frame according to a position relationship among pixels in the multiple frames of sparse depth information and depth information of the pixels included in the multiple frames of sparse depth information. The position relationship is used for mapping respective pixels to the same coordinate system and determining pixels belonging to the same frame. The pixels included in the certain frame and the depth information of the pixels included in the certain frame are combined into new depth information that is determined to be the standard dense depth information. Meanwhile, pre-collected sparse depth information corresponding to the certain frame is used as the standard sparse depth information and combined with the standard dense depth information to generate one training sample.

The video collection is performed on the standard scene by a radar, the obtained multiple pieces of depth information are fused into the standard dense depth information, and any one of the multiple pieces of depth information is used as the standard sparse depth information. Therefore, the training sample can be accurately generated without a high-precision collection device, thereby reducing cost in generating the training sample.

Optionally, one training sample may further include standard pixel information of the standard scene. A color camera may perform collection on the standard scene to obtain the standard pixel information. A collection condition of the color camera is the same as the collection condition of the standard sparse depth information and the collection condition of the standard dense depth information.

For a structure of the deep learning model, reference may be made to the preceding description of a structure of the depth information supplementing model. Sub-model units have the same structure. A sequence of sub-model units in the deep learning model may be adjusted before training, and the sequence of the sub-model units is fixed during and after training. In the case where training of the deep learning model is completed, a current deep learning model is determined to be the depth information supplementing model. The completion of training of the deep learning model may refer to that a sum of loss values of the sub-model units is less than a first loss threshold, a loss value of a tail sub-model unit is less than a second loss threshold, iteration times or training times reach a threshold, or the like.

In a training process, a training sample, a learning rate or training times or iteration times in a training stage may be updated and changed in real time according to model performance, so as to optimize performance of the entire model. In an application process, in response to too large a loss value, the number of sub-model units, training times or training data may be increased so that performance of a current model is improved, thereby achieving self-optimization of an entire system. An increase in the number of sub-model units may refer to applying only a first model composed of first N (N<M) sub-model units and increasing the number of sub-model units on the basis of the first model for a pre-trained depth information supplementing model including M sub-model units. In this case, the number of sub-model units can be increased to M at most. If the number of sub-model units is to be further increased, additional training is required.

In S802, training is performed according to the standard sparse depth information and the standard dense depth information to obtain the depth information supplementing model.

Optionally, the structure of the deep learning model further includes a confidence layer connected to an hourglass network layer, where output of the hourglass network layer also serves as input of the confidence layer. The confidence layer includes a non-linear activation function (Sigmoid) and is configured to process supplementary depth information outputted from the hourglass network layer to obtain confidence information. That is, each pixel in an image has a confidence value. The confidence information is used for calculating a loss value of a sub-model unit to which the confidence layer belongs. The loss value Loss of the sub-model unit may be calculated based on the following formula:

$$Loss = Ic * \|D - D\_gt\|$$

Ic denotes the confidence information, D denotes intermediate depth information, and D_gt denotes the standard dense depth information. In fact, Ic is a confidence matrix determined based on the confidence information, that is, a matrix formed by confidence values of pixels in the confidence information. D is a matrix corresponding to the intermediate depth information outputted by an accumulation layer. D_gt is a matrix corresponding to the standard dense depth information in the training sample. Ic, D and D_gt have the same dimension.

It is to be noted that in the training process, the deep learning model includes the confidence layer, and in the application process, the depth information supplementing model may or may not include the confidence layer.

In S803, intermediate depth information of a target scene is determined according to sparse depth information of the target scene by a sub-model unit in the depth information supplementing model.

In S804, intermediate depth information determined by a tail sub-model unit in the depth information supplementing model is used as dense depth information of the target scene.

The standard sparse depth information and the standard dense depth information of the standard scene are acquired so that the depth information supplementing model is obtained through training, and the sparse depth information is gradually supplemented by the pre-trained depth information supplementing model so that the sparse depth information is supplemented in multiple stages, so as to fully supplement depth information and improve the accuracy of depth information prediction of the model. Moreover, the training sample includes only the standard sparse depth information and the standard dense depth information so that additional data processing can be simplified for input and output of the model and the prediction efficiency of the dense depth information can be improved.

Figure 9:
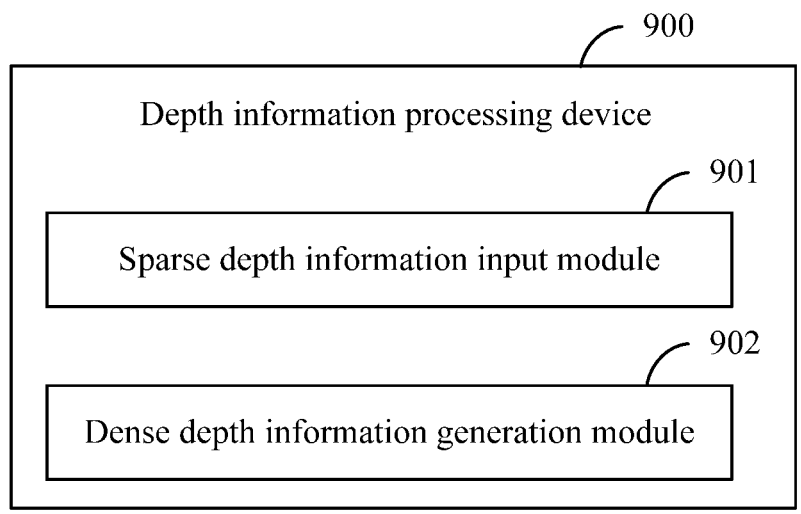
FIG. 9 is a schematic diagram of a depth information processing device according to an embodiment of the present disclosure.

FIG. 9 is a structure diagram of a depth information processing device according to an embodiment of the present disclosure. The embodiment of the present disclosure is applicable to the case where sparse depth information of a target scene is supplemented so that dense depth information of the target scene is generated. The device is implemented by software and/or hardware and is specifically configured in an electronic apparatus having a certain data computing capability.

A sparse depth information input module 901 is configured to determine intermediate depth information of the target scene according to the sparse depth information of the target scene by a sub-model unit in a depth information supplementing model.

A dense depth information generation module 902 is configured to use intermediate depth information determined by a tail sub-model unit in the depth information supplementing model as the dense depth information of the target scene.

According to the technical solution of the present disclosure, pieces of intermediate depth information of the target scene are respectively determined according to the sparse depth information of the target scene by sub-model units in the depth information supplementing model so that the sparse depth information is gradually supplemented, and the intermediate depth information from the tail sub-model unit is determined to be the dense depth information of the target scene so that the sparse depth information is supplemented in multiple stages, depth information is fully supplemented, and the accuracy of depth information prediction is improved.

Further, the sparse depth information input module 901 includes a series input unit and an intermediate transmission unit. The series input unit is configured to obtain intermediate depth information determined by a head sub-model unit in the depth information supplementing model by using the sparse depth information of the target scene as input to the head sub-model unit to. The intermediate transmission unit is configured to: for each sub-model unit in the depth information supplementing model other than the head sub-model unit, obtain intermediate depth information determined by the each sub-model unit by using intermediate depth information determined by a previous sub-model unit of the each sub-model unit as input to the each sub-model unit.

Further, the sparse depth information input module 901 includes a supplementary depth information acquisition unit and a supplementary depth information superimposition unit. The supplementary depth information acquisition unit is configured to process, by an hourglass network layer of the sub-model unit in the depth information supplementing model, inputted depth information to obtain supplementary depth information. The supplementary depth information superimposition unit is configured to superimpose the supplementary depth information with the inputted depth information of the sub-model unit by an accumulation layer of the sub-model unit to obtain the intermediate depth information determined by the sub-model unit.

Further, the supplementary depth information superimposition unit includes a pixel matching subunit and a pixel superimposition subunit. The pixel matching subunit is configured to determine, by the accumulation layer of the sub-model unit, a matching relationship between supplementary pixels in the supplementary depth information and sparse pixels in the inputted depth information. The pixel superimposition subunit is configured to superimpose supplementary depth data of the supplementary pixels with sparse depth data of matched sparse pixels.

Further, the depth information processing device further includes a pixel information input module and an intermediate depth information adjustment module. The pixel information input module is configured to determine depth feature information according to pixel information of the target scene by the sub-model unit in the depth information supplementing model. The intermediate depth information adjustment module is configured to adjust the intermediate depth information determined by the sub-model unit according to the depth feature information.

Further, the depth information processing device further includes a sample acquisition module and a model training module. The sample acquisition module is configured to acquire standard sparse depth information and standard dense depth information of a standard scene. The model training module is configured to perform training according to the standard sparse depth information and the standard dense depth information to obtain the depth information supplementing model.

Further, the sample acquisition module includes a dense depth information collection unit and a sparse depth information generation unit. The dense depth information collection unit is configured to perform image collection on the standard scene using a depth sensor to obtain the standard dense depth information. The sparse depth information generation unit is configured to sample the standard dense depth information to generate the standard sparse depth information.

Further, the sample acquisition module includes a sparse depth information collection unit, a sparse depth information fusion unit and a dense depth information generation unit. The sparse depth information collection unit is configured to perform video collection on the standard scene using a radar device to obtain multiple consecutive frames of sparse depth information. The sparse depth information fusion unit is configured to project the multiple consecutive frames of sparse depth information to generate the standard dense depth information. The sparse depth information generation unit is configured to acquire sparse depth information matching the standard dense depth information from the multiple consecutive frames of sparse depth information and determine the acquired sparse depth information as the standard sparse depth information.

The preceding depth information processing device may perform the depth information processing method provided in any one of embodiments of the present disclosure, and the depth information processing device has corresponding function modules for performing the depth information processing method and beneficial effects corresponding to the depth information processing method.

According to embodiments of the present disclosure, the present disclosure further provides an electronic apparatus, a readable storage medium and a computer program product.

Figure 10:
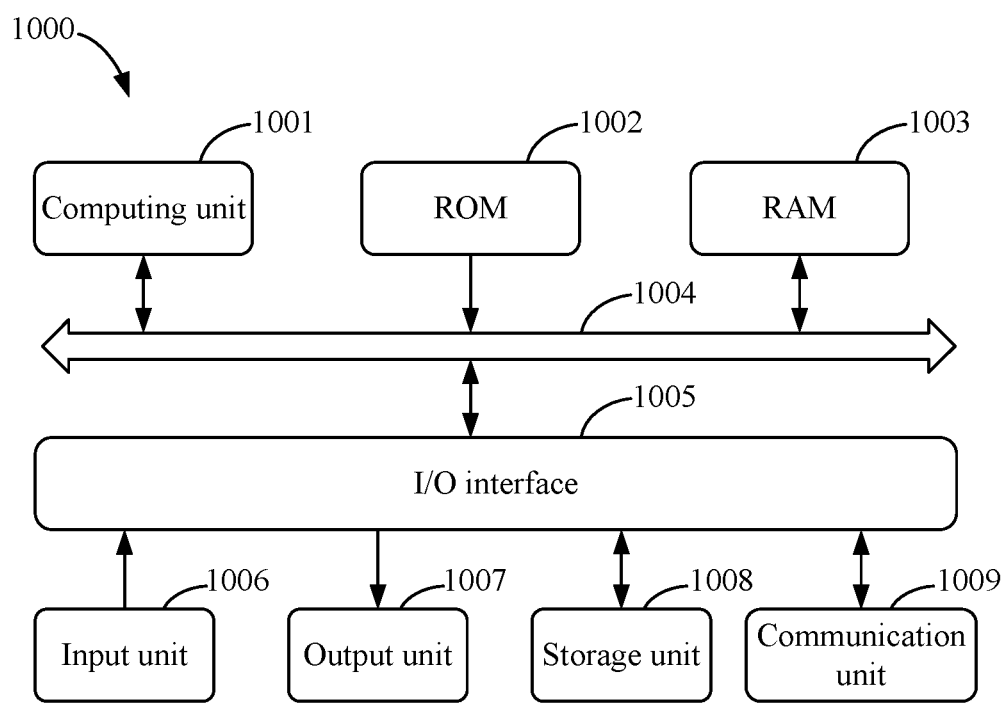
FIG. 10 is a block diagram of an electronic apparatus for implementing a depth information processing method according to an embodiment of the present disclosure.

FIG. 10 is an illustrative block diagram of an example electronic apparatus 1000 according to an embodiment of the present disclosure. The electronic apparatus is intended to represent various forms of digital computers, for example, laptop computer, desktop computer, worktable, personal digital assistant, server, blade server, mainframe computer and other applicable computers. The electronic apparatus may also represent various forms of mobile devices, for example, personal digital assistant, cellphone, smartphone, wearable device and other similar computing devices. Herein the shown components, the connections and relationships between these components, and the functions of these components are illustrative only and are not intended to limit the implementation of the present disclosure as described and/or claimed herein.

As shown in FIG. 10, the apparatus 1000 includes a computing unit 1001. The computing unit 1001 may perform various appropriate actions and processing according to a computer program stored in a read-only memory (ROM) 1002 or a computer program loaded into a random-access memory (RAM) 1003 from a storage unit 1008. The RAM 1003 may also store various programs and data required for operations of the apparatus 1000. The computing unit 1001, the ROM 1002 and the RAM 1003 are connected to each other by a bus 1004. An input/output (I/O) interface 1005 is also connected to the bus 1004.

Multiple components in the apparatus 1000 are connected to the I/O interface 1005. The multiple components include an input unit 1006 such as a keyboard or a mouse, an output unit 1007 such as various types of displays or speakers, the storage unit 1008 such as a magnetic disk or an optical disk, and a communication unit 1009 such as a network card, a modem or a wireless communication transceiver. The communication unit 1009 allows the apparatus 1000 to exchange information/data with other devices over a computer network such as the Internet and/or over various telecommunication networks.

The computing unit 1001 may be a general-purpose and/or special-purpose processing component having processing and computing capabilities. Examples of the computing unit 901 include, but are not limited to, a central processing unit (CPU), a graphics processing unit (GPU), a special-purpose artificial intelligence (AI) computing chip, a computing unit executing machine learning model algorithms, a digital signal processor (DSP) and any appropriate processor, controller and microcontroller. The computing unit 1001 performs the preceding various methods and processing such as depth information processing. For example, in some embodiments, the depth information processing may be implemented as a computer software program tangibly contained in a machine-readable medium such as the storage unit 1008. In some embodiments, part or all of computer programs may be loaded and/or installed on the apparatus 1000 via the ROM 1002 and/or the communication unit 1009. When a computer program is loaded into the RAM 1003 and executed by the computing unit 1001, one or more steps of the preceding depth information processing may be performed. Alternatively, in other embodiments, the computing unit 1001 may be configured, in any other suitable manner (for example, by means of firmware), to perform the depth information processing.

Herein various implementations of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), and computer hardware, firmware, software and/or combinations thereof. The various implementations may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device, and transmitting data and instructions to the memory system, the at least one input device and the at least one output device.

Program codes for implementation of the methods of the present disclosure may be written in one programming language or any combination of multiple programming languages. These program codes may be provided for the processor or controller of a general-purpose computer, a special-purpose computer or other programmable data processing device, to enable functions/operations specified in a flowchart and/or a block diagram to be implemented when the program codes are executed by the processor or controller. The program codes may all be executed on a machine; may be partially executed on a machine; may serve as a separate software package that is partially executed on a machine and partially executed on a remote machine, or a separate software package that is completely executed on a remote machine or a server.

In the context of the present disclosure, the machine-readable medium may be a tangible medium that contains or stores a program available for an instruction execution system, an apparatus or a device to use, or for an instruction execution system, an apparatus and a device to use collaboratedly. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any appropriate combination thereof. Concrete examples of the machine-readable storage medium may include electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display device (for example, a cathode-ray tube (CRT) or liquid-crystal display (LCD) monitor) for displaying information to the user; and a keyboard and a pointing device (for example, a mouse or a trackball) through which the user can provide input for the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by a digital data communication (for example, a communication network) in any form or based on any medium. Examples of the communication network include a local area network (LAN), a wide area network (WAN) and the Internet.

The computing system may include a client and a server. The client and server are generally remote from each other and usually interact through a communication network. The relationship between the client and the server arises by running computer programs, which have a client-server relationship to each other, on respective computers.

It is to be understood that various forms of the preceding flows may be used, with steps reordered, added or removed. For example, the steps described in the present disclosure may be executed in parallel, in sequence or in a different order as long as the desired results of the technical solutions disclosed in the present disclosure can be achieved; the execution sequence of these steps is not limited herein.

The scope of the present disclosure is not limited to the preceding embodiments. It is to be understood by those skilled in the art that various modifications, combinations, sub-combinations and substitutions may be made depending on design requirements and other factors. Any modifications, equivalent substitutions, improvements and the like made within the spirit and principle of the present disclosure fall within the scope of the present disclosure.

What is claimed is:

1. A depth information processing method, comprising:
determining intermediate depth information of a target scene according to sparse depth information of the target scene by a sub-model unit in a depth information supplementing model; and
using intermediate depth information determined by a tail sub-model unit in the depth information supplementing model as dense depth information of the target scene;
wherein the determining the intermediate depth information of the target scene according to the sparse depth information of the target scene by the sub-model unit in the depth information supplementing model comprises:
processing, by an hourglass network layer of the sub-model unit in the depth information supplementing model, inputted depth information to obtain supplementary depth information; and
superimposing the supplementary depth information with the inputted depth information of the sub-model unit by an accumulation layer of the sub-model unit to obtain the intermediate depth information determined by the sub-model unit.

2. The depth information processing method of claim 1, wherein the superimposing the supplementary depth information with the inputted depth information of the sub-model unit comprises:
   determining a matching relationship between supplementary pixels in the supplementary depth information and sparse pixels in the inputted depth information by the accumulation layer of the sub-model unit; and
   superimposing supplementary depth data of the supplementary pixels with sparse depth data of matched sparse pixels.

3. The depth information processing method of claim 1, further comprising:
   determining depth feature information according to pixel information of the target scene by the sub-model unit in the depth information supplementing model; and
   adjusting the intermediate depth information determined by the sub-model unit according to the depth feature information.

4. The depth information processing method of claim 1, further comprising:
   acquiring standard sparse depth information and standard dense depth information of a standard scene; and
   performing training according to the standard sparse depth information and the standard dense depth information to obtain the depth information supplementing model.

5. The depth information processing method of claim 4, wherein the acquiring the standard sparse depth information and the standard dense depth information of the standard scene comprises:
   performing image collection on the standard scene using a depth sensor to obtain the standard dense depth information; and
   sampling the standard dense depth information to generate the standard sparse depth information.

6. The depth information processing method of claim 4, wherein the acquiring the standard sparse depth information and the standard dense depth information of the standard scene comprises:
   performing video collection on the standard scene using a radar device to obtain a plurality of consecutive frames of sparse depth information;
   projecting the plurality of consecutive frames of sparse depth information to generate the standard dense depth information; and
   acquiring sparse depth information matching the standard dense depth information from the plurality of consecutive frames of sparse depth information and determining the acquired sparse depth information as the standard sparse depth information.

7. An electronic apparatus, comprising:
   at least one processor; and
   a memory communicatively connected to the at least one processor;
   wherein the memory stores an instruction executable by the at least one processor to enable the at least one processor to perform:
   determining intermediate depth information of a target scene according to sparse depth information of the target scene by a sub-model unit in a depth information supplementing model; and
   using intermediate depth information determined by a tail sub-model unit in the depth information supplementing model as dense depth information of the target scene;
   wherein the determining the intermediate depth information of the target scene according to the sparse depth information of the target scene by the sub-model unit in the depth information supplementing model comprises:
   processing, by an hourglass network layer of the sub-model unit in the depth information supplementing model, inputted depth information to obtain supplementary depth information; and
   superimposing the supplementary depth information with the inputted depth information of the sub-model unit by an accumulation layer of the sub-model unit to obtain the intermediate depth information determined by the sub-model unit.

8. The electronic apparatus according to claim 7, wherein the superimposing the supplementary depth information with the inputted depth information of the sub-model unit comprises:
   determining a matching relationship between supplementary pixels in the supplementary depth information and sparse pixels in the inputted depth information by the accumulation layer of the sub-model unit; and
   superimposing supplementary depth data of the supplementary pixels with sparse depth data of matched sparse pixels.

9. The electronic apparatus according to claim 7, wherein the instruction, executed by the at least one processor, further enables the at least one processor to perform:
   determining depth feature information according to pixel information of the target scene by the sub-model unit in the depth information supplementing model; and
   adjusting the intermediate depth information determined by the sub-model unit according to the depth feature information.

10. The electronic apparatus according to claim 7, wherein the instruction, executed by the at least one processor, further enables the at least one processor to perform:
   acquiring standard sparse depth information and standard dense depth information of a standard scene; and
   performing training according to the standard sparse depth information and the standard dense depth information to obtain the depth information supplementing model.

11. The electronic apparatus according to claim 10, wherein the acquiring the standard sparse depth information and the standard dense depth information of the standard scene comprises:
   performing image collection on the standard scene using a depth sensor to obtain the standard dense depth information; and
   sampling the standard dense depth information to generate the standard sparse depth information.

12. The electronic apparatus according to claim 10, wherein the acquiring the standard sparse depth information and the standard dense depth information of the standard scene comprises:
   performing video collection on the standard scene using a radar device to obtain a plurality of consecutive frames of sparse depth information;
   projecting the plurality of consecutive frames of sparse depth information to generate the standard dense depth information; and
   acquiring sparse depth information matching the standard dense depth information from the plurality of consecutive frames of sparse depth information and determining the acquired sparse depth information as the standard sparse depth information.

13. A non-transitory computer-readable storage medium, storing a computer instruction for causing a computer to perform the following steps:

determining intermediate depth information of a target scene according to sparse depth information of the target scene by a sub-model unit in a depth information supplementing model; and using intermediate depth information determined by a tail sub-model unit in the depth information supplementing model as dense depth information of the target scene;

wherein the determining the intermediate depth information of the target scene according to the sparse depth information of the target scene by the sub-model unit in the depth information supplementing model comprises:

processing, by an hourglass network layer of the sub-model unit in the depth information supplementing model, inputted depth information to obtain supplementary depth information; and superimposing the supplementary depth information with the inputted depth information of the sub-model unit by an accumulation layer of the sub-model unit to obtain the intermediate depth information determined by the sub-model unit.

* * * * *